United States Patent [19]
Voigt et al.

[11] 4,289,741
[45] Sep. 15, 1981

[54] PROCESS FOR THE PRODUCTION OF HYDROGEN CYANIDE

[75] Inventors: Carl Voigt, Rodenbach; Peter Kleinschmit, Hanau; Eberhard Walter, Wiesbaden, all of Fed. Rep. of Germany

[73] Assignee: Degussa Aktiengesellschaft, Frankfurt, Fed. Rep. of Germany

[21] Appl. No.: 133,358

[22] Filed: Mar. 24, 1980

[30] Foreign Application Priority Data

Apr. 6, 1979 [DE] Fed. Rep. of Germany ....... 2913925

[51] Int. Cl.³ ................................................ C01C 3/02
[52] U.S. Cl. ..................................................... 423/376
[58] Field of Search ................................. 423/375, 376

[56] References Cited

U.S. PATENT DOCUMENTS 2,768,876  10/1956  Wagner ................................ 423/376
4,164,552   8/1979  Weigert ............................... 423/376

FOREIGN PATENT DOCUMENTS 1077198  3/1960  Fed. Rep. of Germany ...... 423/376
 821139  9/1959  United Kingdom ................ 423/376
 839614  6/1960  United Kingdom ................ 423/376

*Primary Examiner*—G. O. Peters
*Attorney, Agent, or Firm*—Cushman, Darby & Cushman

[57] ABSTRACT

The known hydrocyanic acid-methane-ammonia (BMA) process for the production of hydrogen cyanide can now be carried out with liquified gases namely through the presence of additional hydrogen at the beginning of the reaction. The atomic ratio of carbon to nitrogen and hydrogen is from 1:1:7.1 to 1:1.33:13. As additional hydrogen there is the portion of hydrogen present coming out of the reaction "hydrocarbon+NH$_3$". Otherwise the reaction conditions are the same as in the known BMA process.

13 Claims, No Drawings

PROCESS FOR THE PRODUCTION OF HYDROGEN CYANIDE

BACKGROUND OF THE INVENTION

As is known the so-called BMA (hydrocyanic acid-methane-ammonia) process for the production of hydrogen cyanide or hydrocyanic acid starts from methane and ammonia and operates without the presence of oxygen or air.

The reaction itself is carried out in suspended reaction tubes of aluminum oxide which are coated on the inside with a platinum catalyst.

Since the reaction proceeds endothermally the reaction tube is heated and thereby reaction temperatures of around 1300° C. are maintained. In order to avoid the occurrence of reverse reaction the hydrogen cyanide containing gas mixture formed must be quickly cooled to temperatures below 400° to 300° C., which takes place in a water cooled chamber made of aluminum in the reactor head itself, see Ullman Enzyklopädie der technischen Chemie, 4th edition Vol. 9, page 659; Dechema-Monographic, 1959, Vol. 33, pages 28 to 46 and also German patent 959,364 and related Endler U.S. Pat. No. 2,987,383.

While in using pure methane as the hydrocarbon generally there are not observed any disturbing deposits of carbon black there do occur disturbances when using types of natural gas which contain only a few percent of ethane and propane. In employing these gases the catalyst began to be fouled with soot, specifically in such an amount that the operation of the sooted reaction tube must be stopped, see Belgian Pat. No. 828,647.

Sooting occurs especially in experiments to produce hydrogen cyanide directly with propane or butane and ammonia.

Although the use of the most highly pure methane has been found to be very desirable for carrying out the hydrocyanic acid-methane-ammonia process, yet the industrial operation was completely dependent upon the presence of the most highly pure methane and thus tied to the location of the methane.

The purpose of the process of the invention is the carrying out of the hydrocarbon-ammonia reaction to form hydrogen cyanide using a hydrocarbon different from methane and namely in such a way that there is avoided the deposition of carbon black and therewith disturbances in operation.

SUMMARY OF THE INVENTION

It has now been found that hydrogen cyanide or hydrocyanic acid can be produced from liquified gases and ammonia without disturbing the operation through deposition of carbon black under the conditions of the hydrocyanic acid-methane-ammonia process and by producing it in the apparatus belonging to such process, if there is used as the hydrocarbon propane or butane, or any mixture of the two and if the reaction is carried out in the presence of additional hydrogen at an atomic ratio of carbon to nitrogen to hydrogen of 1:1:7.1 to 1:1.33:13 at the beginning of the reaction with reaction conditions known of themselves and the hydrogen cyanide formed is recovered from the gaseous reaction mixture with the help of the likewise known process of working up, whereupon, in a given case, hydrogen containing residual gas is partially returned again into the reaction steps.

The quantitatively greatest proportion of propane respectively n- and isobutane is as a component of the liquified gas recovered from natural gas or petroleum, see Ullmann, Enzyklopädie der technishen Chemie, 4th edition, Vol. 14, pages 657 and 662. Further sources are e.g. liquification of coal or Fischer-Tropsch synthesis, Ullmann page 659 loc. cit. The gases used for the process fulfill the customary quality requirements in the art.

n- and i-Butane are preferably employed as a commercial mixture, very preferably in the ratio of about 75% n-butane to about 25% i-butane.

There can be used any desired mixtures of propane and the n- and i-butanes produced in known manner.

Before their employment in the BMA process both propane and the butanes or their mixtures are customarily released to a pressure of about to 1.5 bar and after mixing with ammonia and additional hydrogen supplied to the reaction tubes where they generally enter at room temperature.

The basis for the carbon black free reaction of liquified gases with ammonia in the presence of hydrogen in the resulting mixture is unknown. However, it apparently goes back to a type of hydrocracking whereby through the presence of the additional hydrogen already at the beginning of the reaction on the catalyst the liquified gases are converted into methane which then in turn reacts with ammonia to form hydrogen cyanide.

The additional hydrogen is the portion of hydrogen present coming favorably from the reaction "hydrocarbon + $NH_3$".

Therefore to begin the reaction the portion of additional hydrogen must be at least sufficiently high that there is stoichiometrically enough for the changing of the corresponding individual hydrocarbon components into methane.

In the case of propane there is needed 2 moles of hydrogen per mole of propane, in the case of n- or i-butane there is needed 3 moles of hydrogen per mole of butane. In using the mixtures of propane and butane, the minimum amount of hydrogen added is in between these values.

This would also explain the fact that the reaction of liquified gas, the yield of hydrogen cyanide as well as the throughput of resulting material per tube and hour can be comparable with that in the direct addition of methane.

It was very surprising that the customary BMA catalyst would be able in the same system to catalyze both a hydrocracking process and also the formation of hydrogen cyanide.

Therewith not only is the formation of carbon black practically avoided but likewise even the separate setting up of a preliminary hydrocracking step.

As especially favorably molar ratio of propane-ammonia-hydrogen corresponding to the atomic ratio C:N:H = 1:1.1:10 is the ratio 1:3.3:6. Hereby hydrogen cyanide is obtained in a yield of 87% based on the propane employed.

In using butane, and indeed preferably the industrial mixture of about 75% n-butane and about 25%, i-butane, the most favorable above mentioned atomic ratio corresponds to the mole ratio of butane to ammonia to hydrogen of 1:4.4:9. The hydrocyanic acid is obtained hereby in a yield of 83% based on the butane mixture employed.

In an illustrative mixture of propane and n-, i-butane (40 vol % propane, 60 vol % n-butane, i-butane wherein the n- and i-butane were present in the ratio of about 75% to about 25%) a favorable molar ratio, corresponding to the most favorable atomic ratio C:N:H = 1:1.1:10 of hydrocarbon to ammonia to hydrogen, is 1:4:7.5. The yield of hydrocyanic acid thereby amounted to 85% based on the hydrocarbon mixture employed.

Of course the presence of hydrogen in the previously customary starting mixtures of methane and ammonia is known.

According to the previously prevailing opinion it was not disturbing there but it reduced the concentration of the hydrogen cyanide formed in the reaction gas. Higher hydrocarbons, however, should only be present to a small extent, see Ullmann Enzyklopädie der technischen Chemie, Vol. 9, 4th edition, page 659.

However, the hydrogen should have a favorable influence on this type of reaction only in a process not carried out industrially in a non-noble metal melt in which there was employed a methane-ammonia mixture which was free of oxygen but in which otherwise in a completely different, especially non-catalytic ways, there is attained hydrogen cyanide. These advantages are thereby chiefly in the influencing of the temperature profile favorable to the formation of hydrocyanic acid. Therefore in the process mentioned the hydrogen can even be replaced by nitrogen, see German Pat. No. 1064933.

Furthermore, it is known to produce hydrogen cyanide according to the Shawinigan process from a gaseous mixture of methane, ethane, propane or butane and ammonia with the help of a fluidized bed of carbon. It goes without saying that in this process there occur carbon black deposits which, however, are not disturbing in this special process but only gradually increase the amounts of fluidized carbon, see Ullmann, loc cit.

However, this process assumes cheap sources of current since it is extraordinarily expensive in energy.

As hydrogen there is used for the process of the invention either the commercial hydrogen or preferably the hydrogen containing residual gas obtained after the separation of hydrogen cyanide and unreacted ammonia. The residual gas of course only corresponds to the amounts of the actually added hydrocarbon used according to the invention.

The portion of the residual gas not used for the synthesis can, as was previously customary, be used for other purposes since the hydrogen obtained is very pure see Example 1.

The ammonia employed is that sold commercially and preferably has a purity of more than 99%.

The reaction is carried out under the customary temperature and pressure conditions of the BMA synthesis, likewise the working up is carried out in known manner, see Ullmann, Enzyklopädie der technischen Chemie, 4th edition, Vol. 9, page 659 and Ullmann, 3rd edition, 1954, Vol. 5, pages 635 to 636 as well as Dechema-Monograph, loc. cit, pages 40 to 41.

Thus for example there are employed as the catalyst noble metals, e.g. platinum. The temperature of the reaction is generally from above 1000° C., e.g. 1050° C., 1100° C., 1200° C., 1250° C., high to about 1300° C. and the pressure is usually about 1 to 1.5 bar.

As stated the technological advance of the present invention is in the use of liquified gases as hydrocarbon components without the occurrence of the in practice damaging deposition of carbon black.

Besides the process of the invention can be carried out under the same pressure and temperature conditions and in the same apparatus as the BMA process, and indeed with nearly the same yield and same throughput as in the use of methane whereby the additional demand for hydrogen can be covered by removing a portion of the residual gas from the process.

It could not be predicted that the customary catalyst for the BMA process could simultaneously function as hydrocracking, catalyst for the liquified gas and as synthesis catalyst for the hydrocyanide acid. Therefore a special preliminary step for the hydrocracking is eliminated.

The process can comprise, consists essentially of or consist of the steps set forth with the material mentioned.

Unless otherwise indicated all parts and percentages are by weight.

The process of the invention will be explained further in connection with the following examples.

DESCRIPTION OF THE PREFERRED EMBODIMENTS

EXAMPLE 1

There was led into a conventional BMA apparatus which consisted of an apparatus for dosing gas and mixing gas, as well as an externally heated reaction furnace in which there was located a reaction tube coated with platinum the following molar composition.

Propane to ammonia to hydrogen = 1:3.3:6, i.e. practically the atomic ratio C:N:H = 1:1.1:10 and heated quickly to 1300° C. at about 1 bar. After passing through the reaction tube the reaction gas mixture formed was cooled to a temperature below 400° C. and above 30° C. in the reactor head in known manner.

The yield was 87 mole % hydrogen cyanide based on the propane employed and 80 mole % hydrogen cyanide based on the ammonia employed.

After the absorption, known in itself, of unreacted ammonia in sulfuric acid as well as hydrogen cyanide in e.g. aqueous sodium hydroxide the residual gas had a gas chromatographically ascertained composition of 96.4 mole % hydrogen, 1.1 mole % nitrogen and 2.4 mole % methane.

EXAMPLE 2

In a manner analogous to Example 1 there was reacted a gas of the following molar composition in the BMA-apparatus:

industrial butane to ammonia to hydrogen = 1:4.4:9, corresponding to the atomic ratio of C:N:H given in Example 1.

The yields were 82.9 mole % of hydrogen cyanide based on the industrial butane employed and 75.4 mole % based on the ammonia employed.

As industrial butane there was employed the mixture of about 75% n-butane and about 25% i-butane.

The residual gas corresponded nearly exactly to the composition of the residual gas of Example 1.

EXAMPLE 3

In a manner analogous to Example 1 there was reacted a gas of the following molar composition in the BMA apparatus:

Hydrocarbon to ammonia to hydrogen = 1:4:7.5, wherein the hydrocarbon consisted of a mixture of 40 vol. % propane and 60 vol. % butane (of which about 75% was n-butane and about 25% i-butane).

The atomic ratio of C:N:H corresponded to that of Example 1.

The yield of hydrocyanic acid was 85% based on the hydrocarbon mixture. The residual gas corresponded nearly exactly to the composition of Example 1.

COMPARISON EXAMPLE

Example 1 was repeated with the difference that the starting mixture did not contain hydrogen. The ratio of propane to ammonia remained unchanged compared to Example 1 and was the molar ratio 1:3.3, or C:N:H=1:1.1:6.

After 19 hours operation the experiment had to be stopped because of severe non regenerable sooting of the tube.

What is claimed is:

1. In a process for the production of hydrogen cyanide or hydrocyanic acid from liquified gas and ammonia according to the conditions of the hydrocyanic acid-methane-ammonia process in a reaction zone, the improvement comprising employing in place of methane a hydrocarbon consisting essentially of propane or at least one butane or a mixture of propane and at least one butane the gaseous mixture consisting essentially of the propane and/or butane, ammonia and hydrogen to provide an atomic ratio of carbon to nitrogen to hydrogen of 1:1:7.1 to 1:1.33:13 at the beginning of the reaction and separating the hydrogen cyanide from the reaction gas mixture.

2. The process of claim 1 wherein a portion of the necessary hydrogen is supplied by returning a part of the residual gas after removal of the hydrogen cyanide and containing hydrogen to the reaction zone.

3. A process according to claim 2 wherein the atomic ratio carbon to nitrogen to hydrogen employed is 1:1.1:10.

4. A process according to claim 3 wherein the reaction is carried out employing a platinum catalyst.

5. A process according to claim 4 wherein the reaction is carried out at 1300° C.

6. A process according to claim 1 wherein the atomic ratio carbon to nitrogen to hydrogen employed is 1:1.1:10.

7. A process according to claim 6 wherein the reaction is carried out employing a platinum catalyst.

8. A process according to claim 7 wherein the reaction is carried out at 1300° C.

9. A process according to claim 1 wherein the reaction is carried out employing a noble metal catalyst.

10. A process according to claim 9 wherein the catalyst is a platinum catalyst.

11. A process according to claim 10 wherein the reaction is carried out at 1300° C.

12. A process according to claim 1 wherein the temperature is at least 1000° C.

13. A process according to claim 12 wherein the temperature is 1200° to 1300° C.

* * * * *